United States Patent
Parigger et al.

(10) Patent No.: US 7,949,453 B2
(45) Date of Patent: May 24, 2011

(54) CONTROL METHOD FOR CLUTCH ARRANGEMENT

(75) Inventors: Martin Parigger, Eggersdorf (AT); Thomas Linortner, Graz (AT); Simon Kaimer, Heiligenkreuz (AT); Heribert Dietrich, Wolfberg i.Sch. (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 490 days.

(21) Appl. No.: 12/190,161

(22) Filed: Aug. 12, 2008

(65) Prior Publication Data

US 2009/0048749 A1 Feb. 19, 2009

(30) Foreign Application Priority Data

Aug. 13, 2007 (DE) .................. 10 2007 038 150

(51) Int. Cl.
*G06F 19/00* (2011.01)
*G06F 7/00* (2006.01)
*G06F 17/00* (2006.01)

(52) U.S. Cl. ............. 701/67; 701/51; 701/68; 477/39; 477/166; 477/179

(58) Field of Classification Search ............ 701/51, 701/67, 68; 192/3.51, 3.55, 3.57, 3.58; 475/35, 475/43; 477/5, 6, 8, 13, 39, 57, 62, 70, 74, 477/77, 79, 83, 86, 87, 166, 171, 179, 180, 477/181

See application file for complete search history.

(56) References Cited

U.S. PATENT DOCUMENTS

| | | | | |
|---|---|---|---|---|
| 5,839,084 | A | | 11/1998 | Takasaki et al. |
| 6,070,685 | A | * | 6/2000 | Takasaki et al. ............ 180/250 |
| 6,808,037 | B1 | * | 10/2004 | Mueller ...................... 180/247 |
| 7,445,581 | B2 | * | 11/2008 | Cring ......................... 477/174 |

FOREIGN PATENT DOCUMENTS

| | | |
|---|---|---|
| DE | 10045757 A1 | 3/2002 |
| DE | 69723824 T2 | 5/2004 |
| DE | 10333946 A1 | 3/2005 |
| EP | 0538504 B1 | 12/1994 |
| EP | 1686031 A2 | 8/2006 |
| EP | 1731349 A1 | 12/2006 |

* cited by examiner

*Primary Examiner* — Jack Keith
*Assistant Examiner* — Rami Khatib
(74) *Attorney, Agent, or Firm* — Harness, Dickey & Pierce, P.L.C.

(57) ABSTRACT

A method controlling a clutch arrangement that serves, in a powertrain of a motor vehicle, for the transmission of a torque from an input element to an output element. Starting from an activated state of the clutch arrangement, a respective estimated torque value is calculated in repeating calculation cycles. A torque build-up value is calculated in dependence on at least one speed difference value. A torque reduction value is calculated in dependence on at least the last calculated estimated torque value. The estimated torque value is re-calculated on the basis of the last calculated estimated torque value by up integration of the calculated torque build-up value and down integration of the calculated torque reduction value. The recalculated estimated torque value is compared with a torque threshold value. The clutch arrangement is deactivated when the recalculated estimated torque value is below the torque threshold value.

31 Claims, 5 Drawing Sheets

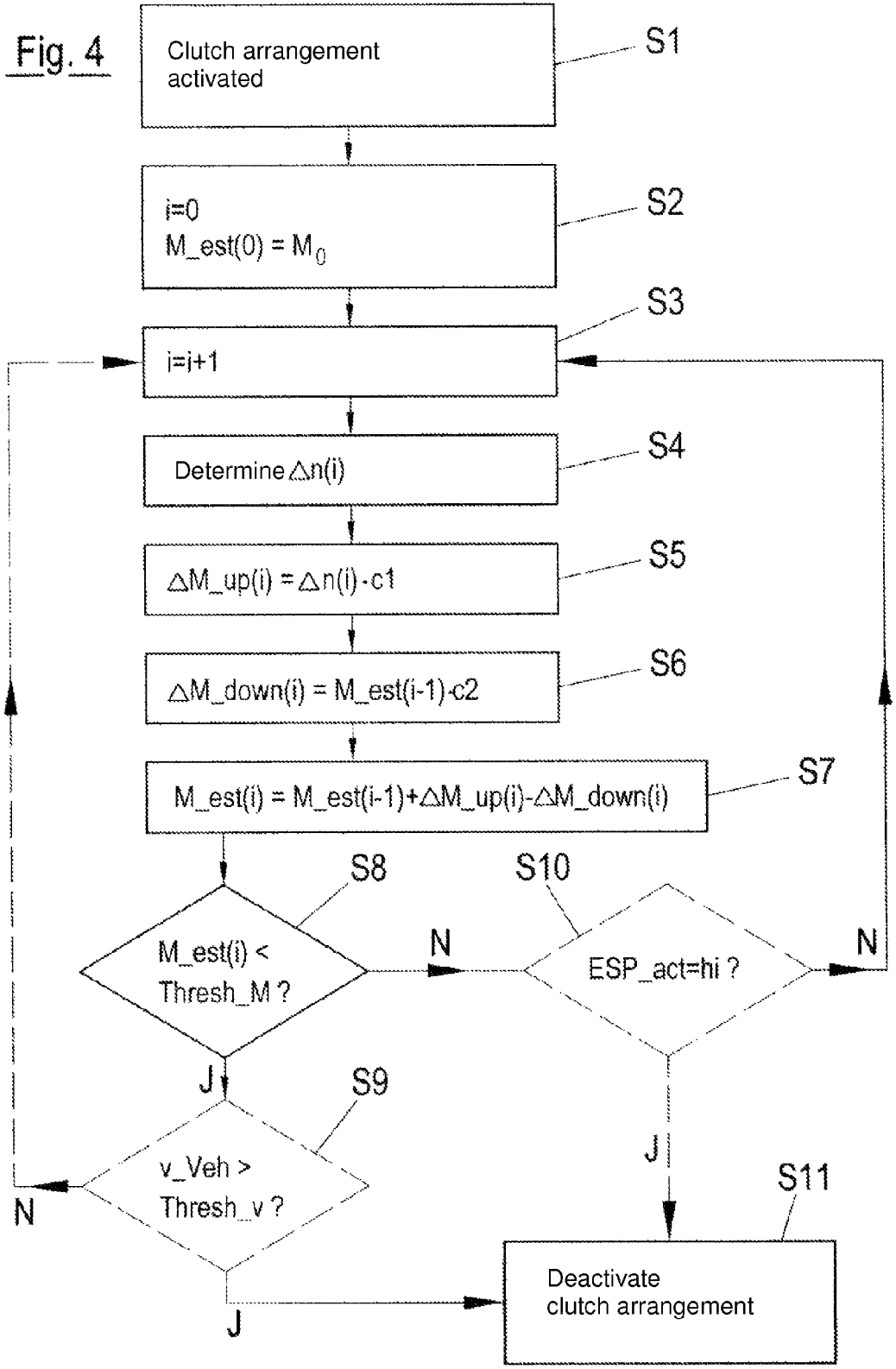

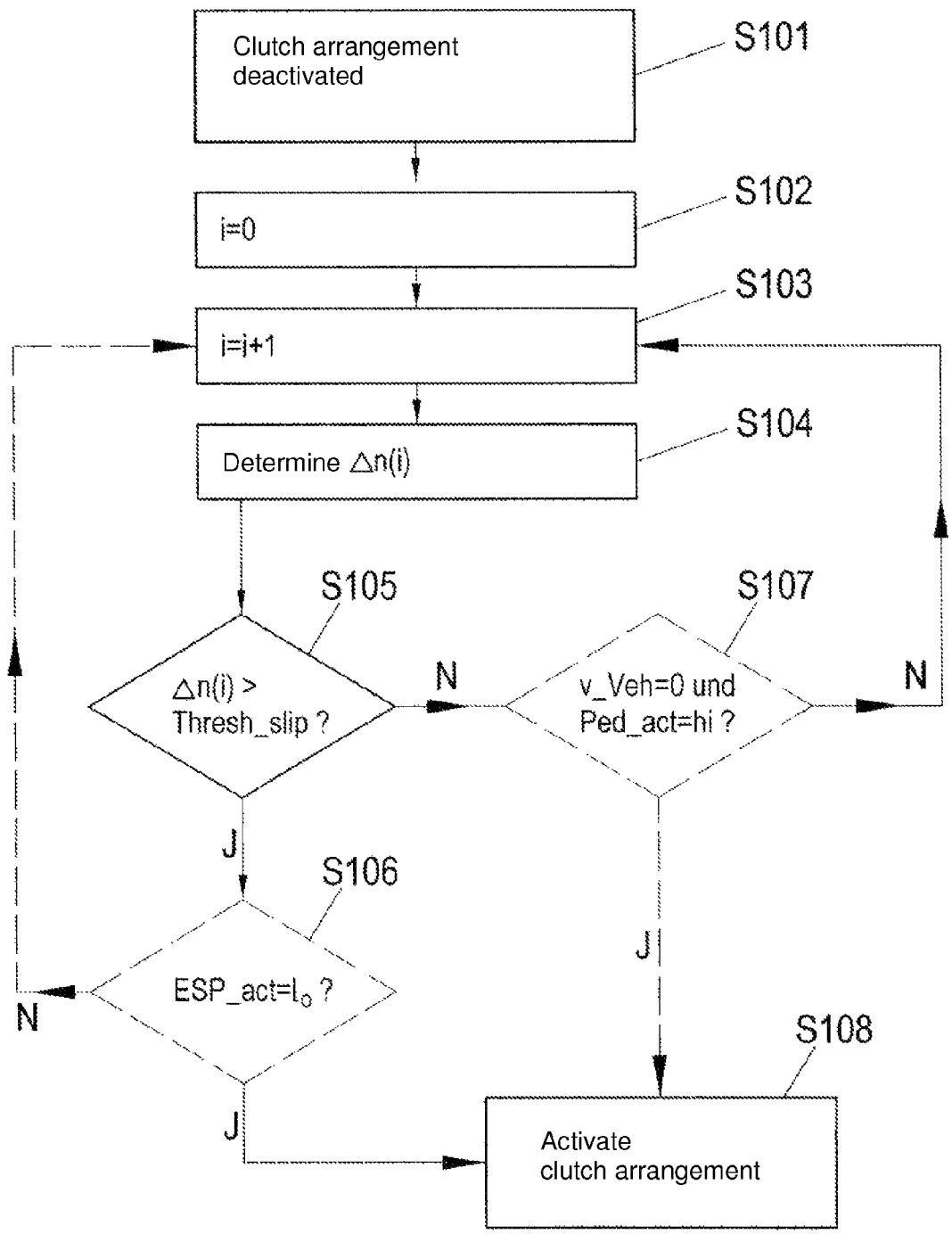

CONTROL METHOD FOR CLUTCH ARRANGEMENT

CROSS-REFERENCE TO RELATED APPLICATIONS

Figure 1:
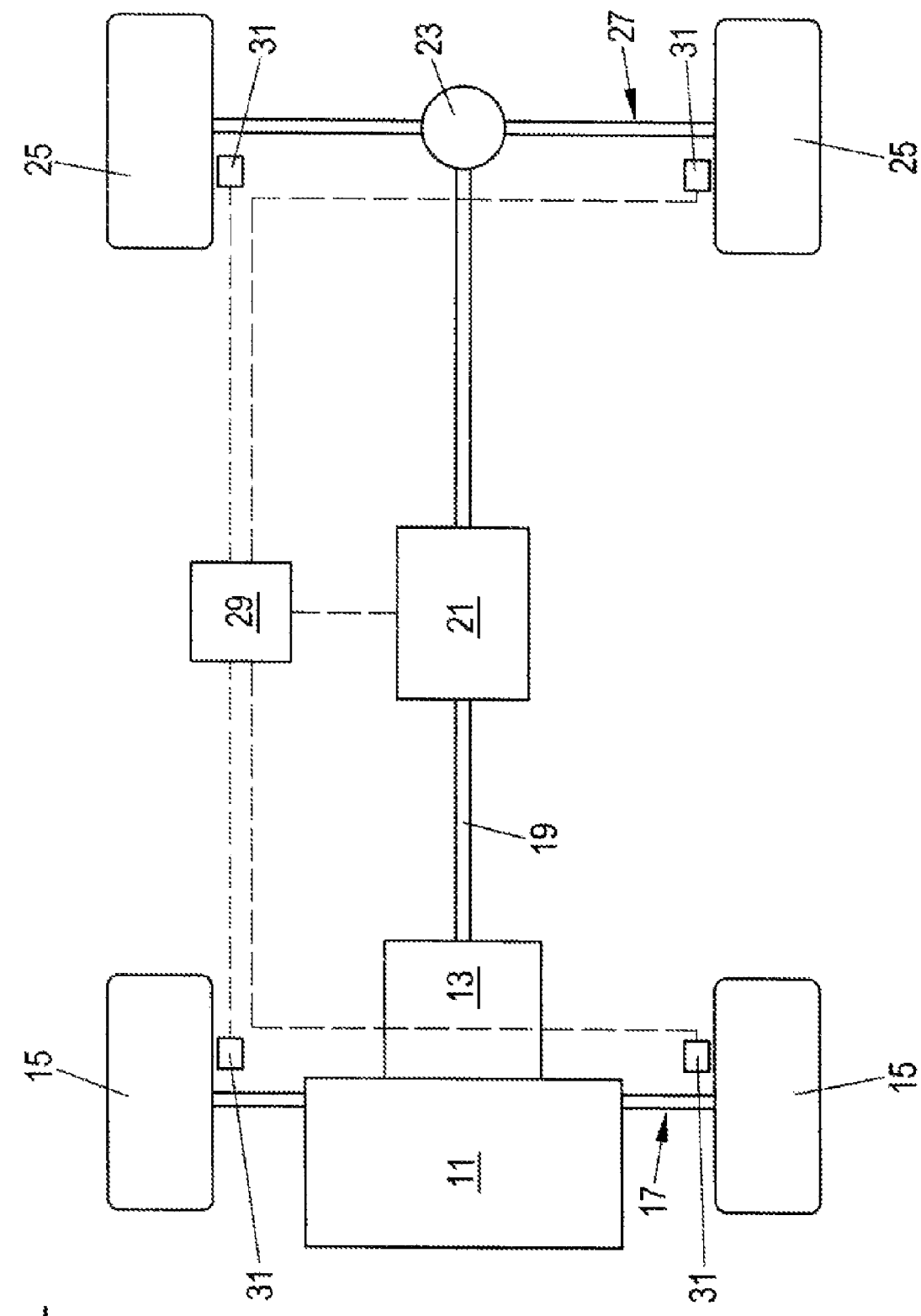

This application claims the benefit and priority of German Patent Application No. 10 2007 038 150.8, filed Aug. 12, 2007. The entire disclosure of the above application is incorporated herein by reference.

FIELD

The present disclosure relates to a method for the control of a clutch arrangement which, in a powertrain of a motor vehicle, serves for the transmission of a torque from an input element to an output element. The clutch arrangement in particular is a shiftable hydromechanical clutch arrangement responsive to a difference in speed.

BACKGROUND

This section provides background information related to the present disclosure which is not necessarily prior art.

A clutch arrangement may serve in a motor vehicle with all-wheel drive, for example, in dependence on a difference in speed between a permanently driven primary axle and a driven secondary axle that may be switched in to transmit the driving torque of a drive unit to the secondary axle. In other applications, a clutch arrangement may serve as a replacement of an axle differential for the transmission of a driving torque to a half-shaft of an axle as a block for a longitudinal differential of an all-wheel driven vehicle or as a block for an axle differential.

Such a clutch arrangement has an input element and an output element (e.g., an input shaft and an output shaft) which may be rotated relative to one another. The clutch arrangement typically has a friction clutch by which the input element and the output element may be operably effectively coupled to one another. The friction clutch is effective in dependence on a hydraulic pressure that prevails in a pressure space of the clutch arrangement. This pressure may be generated by a pump that is responsive to a speed difference between the input element and the output element. The pump may, for example, be a so-called gerotor pump or a P-rotor pump.

When a speed difference is present between the input element and the output element, the pump is driven such that hydraulic fluid is conveyed into the pressure space of the clutch arrangement to actuate the friction clutch. A friction locking coupling is hereby effected between the input element and the output element of the clutch arrangement, which in turn contributes to a reduction in the speed difference between the input element and the output element and, therefore, to a reduced pump power.

It is desirable for some applications to be able to control this generally self-regulating mechanism. The clutch arrangement should therefore be able to be deactivated (i.e., the transmission of a torque from the input element to the output element should be able to be interrupted) in dependence on specific driving states of the vehicle or on the detection of predetermined driving state parameters. It should, however, in turn be avoided that the clutch arrangement is deactivated as long as a significant torque is still being transmitted from the input element to the output element. The deactivation of the clutch arrangement would otherwise be associated with a noticeable load pressure and there would even be the worry of an impairment of the driving stability under certain circumstances. It is admittedly generally possible to detect the instantaneously transmitted torque by suitable sensors to preclude a deactivation of the clutch arrangement as long as a significant torque is being transmitted. The detection of the instantaneously actually transmitted torque is, however, undesirably complex and, therefore, expensive.

The use of proportional valves is also known to be able to actively control the torque transmission while avoiding an undesired load reversal. The use of such proportional valves is, however, likewise undesirably complex.

SUMMARY

This section provides a general summary of the disclosure, and is not a comprehensive disclosure of its full scope or all of its features.

The present disclosure provides a method for the control of a clutch arrangement that enables a deactivation of the clutch arrangement without significant load pressure in a safe and reliable manner and with a small construction effort and/or cost.

Starting from an activated state of the clutch arrangement, a respective estimated torque value is calculated in repeating calculation cycles and the following steps are carried out in so doing: calculating a torque build-up value in dependence on at least one speed difference value corresponding to a speed difference between the input element and the output element; calculating a torque reduction value in dependence on at least the last calculated estimated torque value; recalculating the estimated torque value on the basis of the last calculated estimated torque value by up integration of the calculated torque build-up value and down integration of the calculated torque reduction value; and comparing the recalculated estimated torque value with a torque threshold value, wherein the clutch arrangement is deactivated when the recalculated estimated torque value is below the torque threshold value.

The hydraulic pressure prevailing in the pressure space of the clutch arrangement is ultimately modeled by the method in accordance with the present disclosure, wherein the hydraulic pressure in turn corresponds to the torque instantaneously transmitted by the friction clutch. The deactivation of the clutch arrangement generally takes place in dependence on the speed difference between the input element and the output element of the clutch arrangement. It is hereby taken into account whether an additional pump pressure has been built up. In addition, however, a time delay is taken into account which corresponds to a gradual reduction of the pump pressure and thus of the transmitted torque. This will be explained in more detail in the following.

In a respective calculation cycle, on the one hand, a torque build-up value is calculated as a function of a speed difference value that corresponds to an instantaneous speed difference between the input element and the output element of the clutch arrangement. The speed difference value can be determined by separate sensors that are associated with the input element and the output element. However, the signals of the usually anyway present wheel speed sensors of the vehicle are preferably used for the determination of the speed difference value. The torque build-up value corresponds to a pressure increase in the pressure space of the clutch arrangement and thus to an increase in the transmitted torque.

On the other hand, in the respective calculation cycle, a torque reduction value is calculated as a function of the last calculated estimated torque value. A leakage of the hydraulic system of the clutch arrangement is hereby modeled, in particular an inner pump leakage that is generally pressure dependent.

Additional operating parameters may be taken into account on the calculation of the torque build-up value or on the calculation of the torque reduction value; for example, the temperature of the hydraulic fluid that is either measured or determined by a suitable model formation.

Finally, a current estimated torque value is recalculated on the basis of the estimated torque value calculated in the previous calculation cycle, namely in that the currently calculated torque build-up value is integrated up (i.e., added to) the last calculated torque build-up value and in that the currently calculated torque reduction value is integrated down (i.e. subtracted) from the last calculated estimated torque value.

The thus recalculated estimated torque value is compared with a torque threshold value. If the torque threshold value is fallen below, the clutch arrangement is deactivated since it now has to be assumed that a significant torque is no longer transmitted via the clutch arrangement and there is thus no worry of a load reversal on the deactivation of the clutch arrangement.

The decision on a deactivation of the clutch arrangement may thus take place by simple calculation steps that may be carried out with a small calculation power by a control unit associated with the clutch arrangement. Essentially, only measured signals are required that correspond to the speed difference between the input element and the output element, with the signals of the wheel speed sensors of the vehicle being able to be used for this purpose. The control method may thus be realized with a small construction effort and/or expense since a simple and cost-effective switching valve may be used without the driving comfort hereby being impaired.

The control method described above is only to be understood as a basic model. Different variants and refinements are possible, as will be detailed below.

Provision can be made, for example, for the torque build-up value to be limited to a maximum possible value on the calculation of the torque build-up value independently of the determined speed difference value. This corresponds to a limitation of the maximum possible pressure build-up in a calculation cycle. Alternatively or additionally, a limitation of the recalculated estimated torque value to a maximum value may be provided in a corresponding manner. It is, therefore, hereby taken into account that only a specific maximum pressure in the pressure space of the clutch arrangement is reached even with a long duration of the speed difference between the input element and the output element.

The falling below of the named torque threshold value by the currently recalculated estimated torque value forms the sole criterion for the deactivation of the clutch arrangement. In this case, the clutch arrangement is therefore deactivated when and precisely only when, the recalculated estimated torque value is below the torque threshold value.

Alternatively, however, an additional criterion may be taken into account for the deactivation of the clutch arrangement. The clutch arrangement is, therefore, only deactivated case when the recalculated estimated torque value is below the torque threshold value and if, at the same time, at least one additional switch-off criterion is satisfied. In this connection, an "additional switch-off criterion" is to be understood as a criterion that is on its own not yet sufficient for the deactivation of the clutch arrangement, but only forms a necessary additional criterion when the calculated estimated torque value is below the torque threshold value. Such an additional switch-off criterion may, for example, consist of the fact that the vehicle speed has to exceed a specific speed threshold value. Otherwise, the clutch arrangement remains in the activated state despite the falling below of the torque threshold value.

So-called priority switch-off criteria may furthermore also be taken into account for the deactivation of the clutch arrangement. A priority switch-off criterion means that the clutch arrangement is deactivated fully independently of the result of the explained comparison of the recalculated estimated torque value with the torque threshold value. A priority switch-off criterion may, for example, be present when a dynamic driving regulation unit of the vehicle carries out an active intervention in the driving stability (e.g., on an intervention of an anti-blocking system (ABS) or an intervention of an electronic stability program (ESP)). The clutch arrangement is, therefore, at least deactivated when the priority switch-off criterion is satisfied.

After the clutch arrangement has been deactivated, criteria may also be checked to decide whether the clutch arrangement should be activated again. It is preferred for this purpose for an instantaneous speed difference value to be determined repeatedly that corresponds to a speed difference between the input element and the output element of the clutch arrangement, with this speed difference value being compared with a slip threshold value. The named speed difference value may in turn be determined in a simple manner with reference to the signals of the rotational speed sensors of the vehicle. The named slip threshold value may be a predetermined constant. Alternatively, the slip threshold value may, for example, be dependent on the vehicle speed, the steering angle and/or a kinematic difference speed of the vehicle (dependent on the corner radius, axial distance, wheel diameter and any gear ratios). If the speed difference value determined in this way is below the slip threshold value, the clutch arrangement is generally activated.

Provision is made for the exceeding of the slip threshold value by the determined speed different value to form the required and sufficient condition for the repeated activation of the clutch arrangement. Alternatively, however, it is also possible that additional switch-on criteria and/or priority switch-on criteria are taken into account for the activation of the clutch arrangement The clutch arrangement may have a friction clutch that couples the input element with the output element in dependence on a hydraulic pressure of a pump prevailing in a pressure space of the clutch arrangement, with the deactivation of the clutch arrangement taking place by opening a drain valve that connects the pressure space to a low pressure space, with an orifice having a substantially temperature independent leakage characteristic being arranged at a leakage line that leads from the pressure space to the low pressure space and extends parallel to the pump.

A leakage line may, therefore, be arranged parallel to the pump conveying the hydraulic fluid from the low pressure space into the pressure space that deliberately permits a constant leakage of hydraulic fluid from the pressure space into the low pressure space. This leakage may generally be pressure dependent. It is, however, important that a defined leakage rate is defined and that this leakage rate (leakage volume/time) at the leakage line is substantially independent of the temperature of the hydraulic fluid. The temperature dependence of the leakage rate of the pump is hereby relativized so that a temperature dependence of the clutch characteristic is much reduced.

A fast opening of the drain valve and thus a fast deactivation of the clutch arrangement is hereby made possible. In addition, the pressure estimate explained above (calculation and taking into account of a respective torque reduction value) on the basis of the defined leakage with a speed difference of zero and on the basis of the reduced temperature dependence delivers a particularly accurate and reliable result. The vehicle may thus be switched over particularly fast and reliably without load reversal from an all-wheel drive operation (AWD operation if high traction is required) to a drive of only the primary axle (2WD operation (e.g., for shunting maneuvers)).

A sufficient independence of the leakage rate from the temperature may be achieved in that an orifice is arranged in the leakage line. Unlike a throttle, for example, an orifice only allows a turbulent flow of the hydraulic fluid passing through the orifice so that the flow resistance is practically hardly temperature dependent.

The flow rate Q (=volume per time, $\Delta V/\Delta t$) of a turbulent flow through an orifice is thus calculated as follows:

$$Q = \alpha \cdot A \cdot \sqrt{\frac{2 \cdot \Delta p}{\rho}}$$

where $\alpha$ is the drag coefficient, A is the area of the opening cross-section, $\rho$ is the density of the fluid and $\Delta p$ is the pressure difference. The drag coefficient $\alpha$ is a dimensionless constant that depends only on the geometry of the orifice. It amounts to approximately 0.6 for a sharp orifice. This corresponds to a resistance coefficient $\zeta = 1/\alpha^2$ of approximately 2.7 to 2.8.

In contrast, the flow rate Q of a throttle in the model of a laminar flow through a pipe in accordance with the Hagen-Poiseuille law amounts to:

$$Q = \frac{\pi \cdot r^4}{8 \cdot \eta \cdot l} \cdot \Delta p$$

where r is the radius of the opening cross-section, $\eta$ is the dynamic viscosity of the fluid, l is the length of the pipe or of the throttle and $\Delta p$ is the pressure difference. Since the dynamic viscosity $\eta$ of the usually used hydraulic fluid is temperature dependent, the flow rate Q of a throttle is also temperature dependent.

The pump used in the clutch arrangement may be overdimensioned to compensate the leakage of hydraulic fluid by the named leakage line.

The orifice arranged in the leakage line may have an opening passage that has an inner diameter in a range from approximately 0.4 mm to 0.8 mm and a length in a range from only approximately 0.2 mm to 0.5 mm. A suitable leakage rate that is substantially independent of the temperature of the hydraulic fluid hereby results in dependence on the pressure of the hydraulic fluid.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
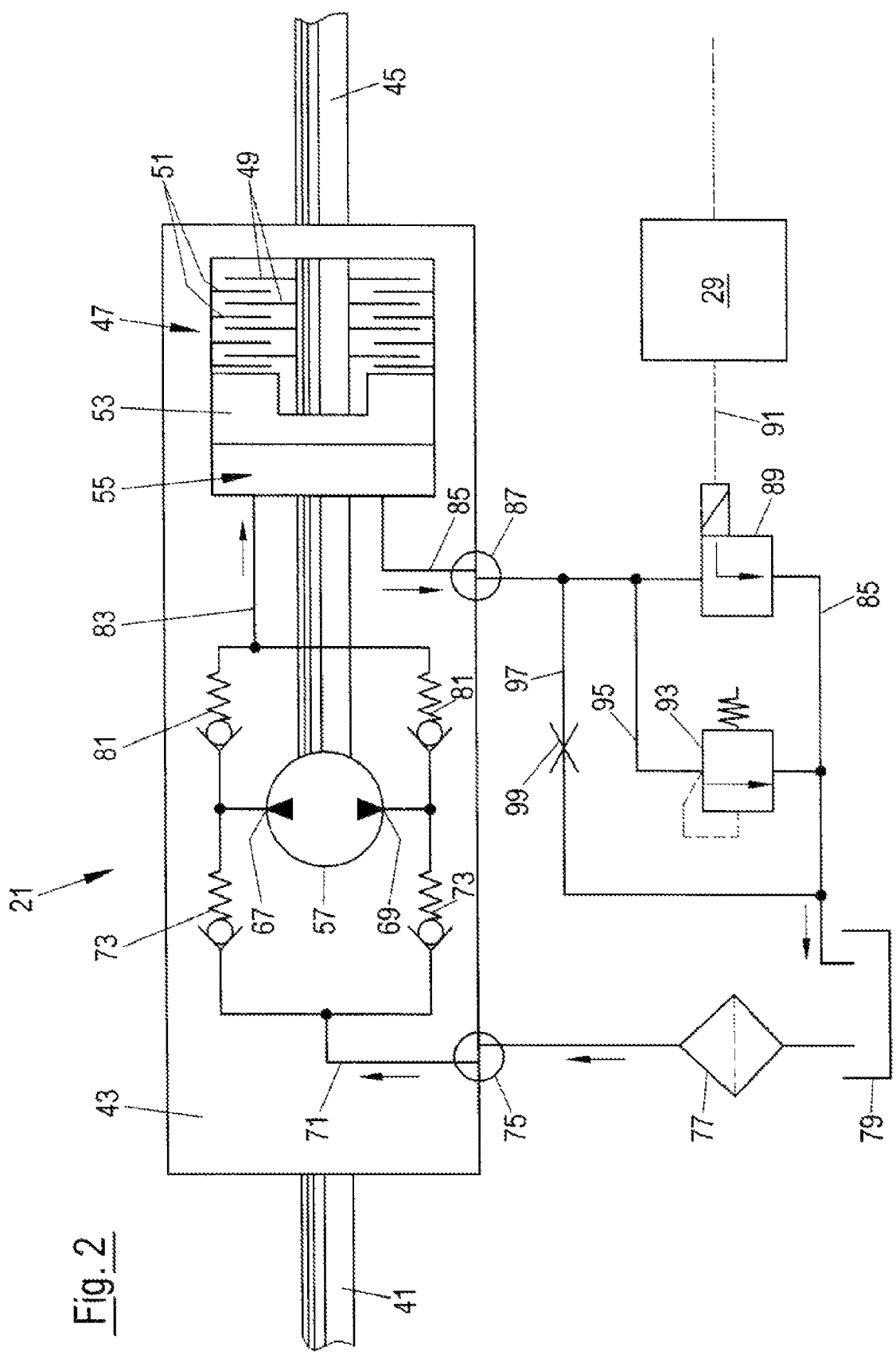
Figure 3:
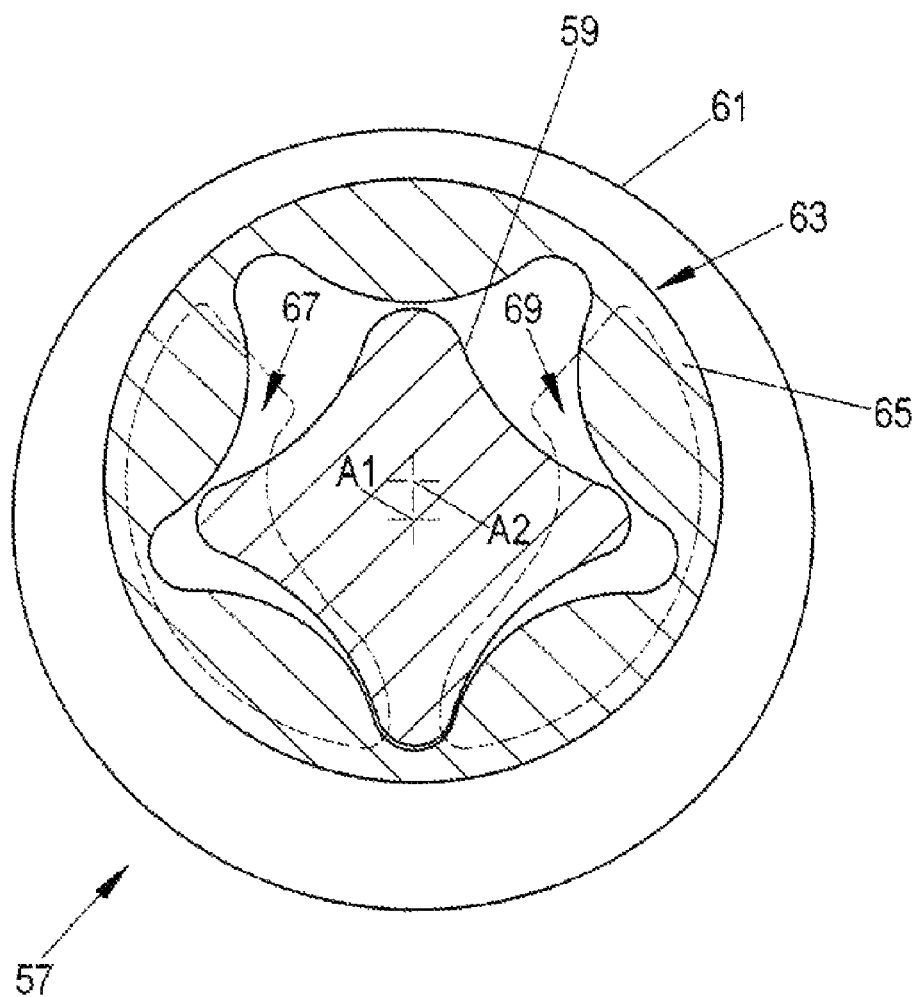

FIG. 1 shows a powertrain of a motor vehicle with a clutch arrangement;
FIG. 2 shows a clutch arrangement;
FIG. 3 shows a cross-sectional view of a gerotor pump;
FIG. 4 shows a flow diagram of a method for the deactivation of a clutch arrangement; and
FIG. 5 shows a flow diagram of a method for the activation of a clutch Corresponding reference numerals indicate corresponding parts throughout the several views of the drawings.

DETAILED DESCRIPTION

Example embodiments will now be described more fully with reference to the accompanying drawings.

FIG. 1 schematically illustrates a powertrain of a motor vehicle. An engine 11 drives two wheels 15 of a front axle 17 via a transmission unit 13 and a front axle differential gear (not shown). The front axle 17 thus forms a primary axle. In addition, the engine 11 drives two wheels 25 of a rear axle 27 via the transmission unit 13, a Cardan shaft 19, a clutch arrangement 21 and a rear axle differential gear 23. The rear axle 27 in this respect forms a secondary axle of the vehicle. An electronic control unit 29 of the vehicle is connected at an input side to four wheel speed sensors 31 that are associated with the front wheels 15 and the rear wheels 25. The control unit 29 may optionally be connected to additional sensors such as, for example, a steering angle sensor, a yaw rate sensor, etc. (not shown). The control unit 29 is connected to the clutch arrangement 21 at an output side. The clutch arrangement 21 serves to transmit some of the driving torque of the engine 11 to the rear axle 27, and indeed in dependence on control signals of the control unit 29. The vehicle is all-wheel driven provided that a driving torque is transmitted to the rear axle 27 via the clutch arrangement 21. The clutch arrangement 21 may also be provided at a different position of the powertrain. For example, at the transmission unit 13 or at the rear axle differential gear 23.

FIG. 2 schematically illustrates a configuration of the clutch arrangement 21. The clutch arrangement 21 may have an input shaft 41 that is rotationally fixedly connected to a rotatable inner housing 43, and an output shaft 45 that is rotatable relative to the input shaft 41. The input shaft 41 and the output shaft 45 are rotatably supported at a stationary outer housing of the clutch arrangement 21 (not shown). The clutch arrangement 21 may further include a friction clutch 47 with a plurality of internal disks 49 and a plurality of external disks 51 in an alternating arrangement. The internal disks 49 are axially displaceable, but rotationally fixedly connected to the output shaft 45. The external disks 51 are axially displaceable, but rotationally fixedly connected to the inner housing 43 (and thus also to the input shaft 41). The friction clutch 47 furthermore has a ring-shaped, axially displaceable pressure piston 53 whose front side selectively presses the internal disks 49 and the external disks 51 against one another to transmit a torque from the input shaft 41 to the output shaft 45. The rear side of the pressure piston 53 faces a hydraulic pressure space 55.

The clutch arrangement 21 furthermore has a pump 57 that may be driven by a rotary movement of the input shaft 41 and the output shaft 45 relative to one another to generate a hydraulic pressure in the pressure space 55 to move the pressure piston 53 in the engagement sense of the friction clutch 47. The pump 57 may generally be any desired hydraulic pump that is responsive to a speed difference and, in particular, may be a circulating compressor or a stroke compressor.

The pump 57 may preferably be a gerator pump whose structure will be explained in the following with reference to FIG. 3.

FIG. 3 shows a cross-sectional view of a gerator pump 57 in accordance with FIG. 2. The pump 57 has an internal runner 59 that is rotationally fixedly connected to the output shaft 45 in accordance with FIG. 2 and rotates around an axis A1. The pump 57 furthermore has a ring section 61 that is rotationally fixedly connected to the pump housing (not shown) as well as to the inner housing 43 of the clutch arrangement 21 in accordance with FIG. 2 and accordingly also to the input shaft 41. In this respect, the ring section 61 likewise rotates around the axis A1. The ring section 61 has a circular cut-out 63 whose center A2 is offset with respect to the axis of rotation A1. In addition, the pump 57 has an external runner 65 that is rotatably supported around axis A2 in the cut-out 63 of the ring section 61 and which surrounds the internal runner 59 and contacts it. The internal runner 59 has an outer toothed arrangement and the external runner 65 has an inner toothed arrangement, with the number of teeth of the outer runner 65 being at least one tooth greater than the number of teeth of the internal runner 59.

In addition, a first connection opening 67 and a second connection opening 69 may be seen in FIG. 3 that are formed at a second of the pump housing which is shown axially offset with respect to the cross-sectional plane shown in FIG. 3. Depending on the sense of rotation of the internal runner 59 relative to the ring section 61, the first connection opening 67 serves as a pump inlet and the second connection opening 69 serves as a pump outlet or vice versa.

Provided that the internal runner 59 rotates relative to the ring section 61 and to the connection openings 67 and 69, the internal runner 59 conveys hydraulic fluid, provided at one of the connection openings 67 and 69, in the peripheral direction to the other connection opening 69 or 67. This is due to the fact that the hydraulic fluid is enclosed in a gap that is formed between the internal runner 59 and the external runner 65. Since the volume of this gap varies during the rotation of the internal runner 5, the hydraulic fluid is sucked in from the one connection opening 67 or 69 and expelled into the other connection opening 69 or 67. The change in the volume of the respective gap during the rotation of the internal runner 59 is in turn due to the fact that the internal runner 59 drives the external runner 65 to make a rotary movement, with different rotational speeds being adopted due to the different number of teeth (i.e., the external runner 65 rotating around the axis A2 rotates more slowly than the internal runner 59).

Referring again to FIG. 2, the connection openings 67 and 69 of the pump 57 are illustrated schematically. An intake line 71 is associated with the pump 57. Intake line 71 is connected to the two connection openings 67 and 69 of the pump 57 via a respective check valve 73 at the suction side. The intake line 71 is connected against the flow direction of the hydraulic fluid via a rotary leadthrough 75 and an oil filter 77 to a pump sump 79. The oil filter 77 and the sump 79 are arranged in the already named stationary outer housing of the clutch arrangement 21. At the pressure side, the pump 57 is connected via check valves 81 to a pressure line 83 that leads to the pressure space 55 of the clutch arrangement 21. The hydraulic fluid may flow from the pressure space 55 via a drain line 85 and a further rotary leadthrough 87 to the sump 79, as will be explained below.

As stated above, the pump 57 may be driven relative to the pump housing with ring section 61 by a rotary movement of the internal runner 59 (FIG. 3), corresponding to a rotation of the input shaft 41 relative to the output shaft 45 (FIG. 2). With reference to FIG. 1, this means that the pump 57 conveys hydraulic fluid when a speed difference is present between the wheels 15 of the front axle 17, on the one hand, and the wheels 25 of the rear axle 27, on the other hand. Depending on whether the input shaft 41 rotates faster or more slowly than the output shaft 45, the hydraulic fluid is sucked in via one of the check valves 73 and conveyed into the pressure space 55 via one of the check valves 81 (FIG. 2). Due to the hydraulic pressure hereby built up in the pressure space 55, the pressure piston 53 is moved in the direction of the disks 49 and 51 of the friction clutch 47 to bring the disks 49 and 51 into increasing friction locking with one another. The input shaft 41 and the output shaft 45 are hereby coupled to one another to an increasing degree in a rotationally effective manner such that a driving torque is transmitted from the input shaft 41 via the clutch arrangement 21 to the output shaft 45. Since a stronger coupling of the output shaft 45 to the input shaft 41 contributes to a reduction in the speed difference, the clutch arrangement 21 acts in a self-regulating manner.

The actuation of the friction clutch 47 on the presence of a speed difference between the input shaft 41 and the output shaft 45 only occurs, however, when the hydraulic pressure space 55 is closed sufficiently tightly. In order, in contrast, to be able to selectively deactivate the clutch arrangement 21, a drain valve 89 is arranged along the already named drain line 85. The drain valve 89 may be a magnetic valve that is controlled by the control unit 29 via an electrical control line 91. If the drain valve 89 is closed, the clutch arrangement 21 may couple the output shaft 45 to the input shaft 41 in the explained self-regulating manner. A pressure decrease and a corresponding reduction in the torque transmitted by the friction clutch 47 only take place due to leakage with a closed drain valve 89. If, in contrast, the drain valve 89 is open, the hydraulic fluid conveyed into the pressure space 55 may escape via the drain line 85 into the sump 29 so that ultimately only a small driven torque (drag torque) is transmitted from the input shaft 41 to the output shaft 45, even during the presence of a speed difference between the input shaft 41 and the output shaft 45.

The drain valve 89 may be arranged in the stationary outer housing of the clutch arrangement 21. An excess pressure valve 93 may optionally be arranged parallel to the drain valve 89 at an excess pressure line 95. The maximum possible hydraulic pressure in the pressure space 55 is hereby limited, for example, for the case of a malfunction of the drain valve 89.

If the aforesaid leakage, which also results in a pressure decrease in the pressure space 55 with a closed drain valve 89, were caused solely by the inner leakage of the pump 57, the characteristic of the clutch arrangement 21 (i.e., the dependence of the transmitted torque on the speed difference between the input element and the output element) would have an undesirably high temperature dependence. The inner leakage of the pump 57 may be dependent on the viscosity of the fluid, which is in turn highly temperature dependent. Such a high temperature dependence of the clutch characteristic is not desired since such a temperature dependence would make the pressure build-up/pressure decrease model explained in the following more complicated or could falsify it. In addition, a very different characteristic of the torque transmission, and thus of the performance of the vehicle, would result in dependence on the temperature of the hydraulic fluid in the clutch arrangement 21.

To reduce temperature dependence in a simple manner and with a low effort and/or cost, an additional leakage of the hydraulic fluid from the pressure space 55 is effected directly by means of an orifice having a substantially temperature independent leakage characteristic in order hereby to compensate the temperature dependence of the inner leakage rate of the pump 57. For this purpose, such an orifice 99 may be arranged at a leakage line 97 that extends parallel to the pump 57 from the pressure space 55 to the sump 79. The desired temperature independence of the leakage rate of the orifice 99 is based on the fact that—unlike a throttle—the orifice opening generates a turbulent flow so that the volume flow essentially only depends on the pressure of the hydraulic fluid in the temperature ranges relevant here. The orifice 99 may be located, for example, in the already named stationary outer housing of the clutch arrangement 21. A switch valve may also optionally be provided in series with the orifice 99 along the leakage line 97.

If the hydraulic valve 89 should be opened, starting from an activated state of the clutch arrangement 21, there is the risk of an unwanted load reversal if a torque is being transmitted from the input shaft 41 to the output shaft 45 at the time of the opening of the drain valve 89. Such a load reversal can be avoided in a simple manner on the basis of a pressure build-up/pressure reduction model and corresponding actuation of the drain valve 89.

FIG. 4 shows a flow diagram of a method for the deactivation of the clutch arrangement 21. After the clutch arrangement 21 has been activated by closing the drain valve 89 (step S1) and after a preparameterization has taken place (step S2), calculations and checks are carried out in a calculation cycle in accordance with steps S3 to S10, with the result being that either the calculation cycle is repeated or the clutch arrangement 21 is deactivated (step S11).

In the preparameterization step S2, a current counter i for the instantaneous calculation cycle is set to zero and a starting value $M_O$ is set for the estimated torque value M_est to be calculated subsequently, which is fixed, for example, by empirical determination.

The first calculation cycle starts in that the running counter i is increased by one unit (step S3). In a step S4, an instantaneous speed difference value Δn(i) is determined, which corresponds to a speed difference between the input shaft 41 and the output shaft 45 of the clutch arrangement 21. The speed difference value Δn(i) may be calculated from the signals of the wheel speed sensor 31 (FIG. 1), with the sensor signals of the wheels 15 and 25 of axle 17 or 27, respectively, being averaged. In step S5, a current torque build-up value ΔM_up (i) may be calculated which is proportional to the determined speed difference value Δn(i). The speed difference value Δn(i) is multiplied by a constant c1 for this purpose (step 5). The constant c1 is characteristic for the specific clutch arrangement 21 and in particular for the specific pump 47. The constant c1 may be empirically determined by calibration of the clutch arrangement 21.

In addition, in step S6, a current torque reduction value Δ M_down(i) is calculated, which is proportional to the estimated torque value M_est(i−1), which was calculated in the previous calculation cycle. This last calculated estimated torque value M_est(i−1) is, therefore, multiplied by a constant c2, which is likewise characteristic for the specific clutch arrangement 21 and in particular for the specific pump 57, and optionally for the orifice 99. The constant c2 also may be empirically determined by calibration of the clutch arrangement 21. Since no last calculated estimated torque value M_est(i−1) is present in the first calculation cycle (i=1), use is made for this purpose of the initial value $M_0$, which was fixed in the step S2. The order of steps S5 and S6 may also be swapped over.

In step S7, the current estimated torque value M_est(i) may be recalculated, and indeed in that the current estimated build-up value ΔM_up(i) is added to the estimated torque value M_est(i−1) which was calculated in the previous calculation cycle and in that the currently calculated torque reduction value ΔM_down(i) is subtracted from this.

In step S8, the recalculated estimated torque value M_est(i) may be compared with a torque threshold value Thresh_M. Torque threshold value Thresh_M may be a predetermined constant and correspond, for example, to a torque of 50 Nm.

Provided that the recalculated estimated torque value M_est(i) is less than the torque threshold value Thresh_M, the clutch arrangement 21 may be deactivated (step S11). However, in an optional step S9, an additional switch-off criterion may be checked. A check is made, for example, whether the vehicle speed v_Veh is larger than a speed threshold value Thresh_v. If this applies, the clutch arrangement 21 may be deactivated (i.e., the drain valve 89 may be opened to interrupt a torque transmission from the input shaft 41 to the output shaft 45). If, in contrast, it was found in step S9 that the vehicle speed v_Veh is less than the speed threshold Thresh_v, a return to step S3 is made and a new calculation cycle is started. Further additional switch-off criteria may also be checked in step S9.

If it was found in step S8 that the recalculated estimated torque value M_est(i) is larger than the torque threshold value Thresh_M, a return may be made to step S3 to start a new calculation cycle. However, a check may also be made in an optional step S10 whether a priority switch-off criterion is satisfied. A check is, for example, made in step S10 whether it is signaled by a dynamic driving regulation unit of the vehicle of higher order than the control unit 29 that an intervention in the driving stability of the vehicle is just taking place (e.g., ESP). If this applies, the clutch arrangement 21 may be deactivated (step S11). Otherwise, a new calculation step may be started with step S3. The check of the priority switch-off criteria in accordance with step S10 can, for example, also take place after step S3 and before step S4 to ensure that the priority switch-off criterion is checked in every calculation cycle. Further priority switch-off criteria may also be checked in step S10.

Clutch assembly 21 may thus be deactivated without any substantial load pressure on the basis of the calculations and checks in accordance with steps S3 and S9 in accordance with FIG. 4, with an intervention of a higher order dynamic driving regulation unit optionally being possible (step S10).

A defined pressure reduction, which is temperature independent to the largest degree, is effected in the pressure space 55 on the basis of the arrangement of the orifice 99 in a leakage line 97 parallel to the pump 57 (FIG. 2) with a closed drain valve 89. Fast opening of the drain valve 89 and thus a fast deactivation of the clutch arrangement 21 is hereby made possible. In addition, the pressure estimate explained above (calculation and taking into account of a respective torque reduction value ΔM_down) delivers a particularly exact and reliable result on the basis of the defined leakage and of the reduced temperature dependence. It is, however, also generally possible to detect the temperature of the hydraulic fluid in a metrological manner and to take it into account in a calculatory manner in the pressure build-up/pressure reduction model.

FIG. 5 shows a flow diagram of a method for the activation of the clutch arrangement 21, starting from a deactivated state (i.e., when the drain valve 89 is open).

First, a counter i for the current calculation cycle is set to the value zero after the deactivation of the clutch arrangement 21 in a step S102.

The respective calculation cycle starts in that the counter i is increased by one unit in step S103.

In step S104, a speed difference value Δn(i) may be determined, which corresponds to a speed difference between the input shaft 41 and the output shaft 45, similar to step S4 of FIG. 4.

In step S105, a check may be made whether the speed difference value Δn(i) is larger than a slip threshold value Thresh_slip. The slip threshold value may be a predetermined constant or a speed dependent value. The speed difference value Δn(i) or the slip threshold value Thresh_slip may be corrected before the comparison in accordance with step S105 by a cornering correction value or a corner correction factor, with this correction, for example, taking place with reference to the signals of the wheel speed sensors 31, with reference to the signals of a steering angle sensor or with reference to the signals of a yaw rate sensor (not shown). Taking into account a tire tolerance correction value or a tire tolerance correction factor is also possible.

Provided that the speed difference value Δn(i) is larger than the slip threshold value Thresh_slip, the clutch arrangement 21 may be activated (step S108). Optionally, however, an additional switch-in criterion may be taken into account. For example, a check may first be made in step S106 whether no driving stability of a higher order dynamic driving regulation unit is currently taking place. If no such intervention is present is the coupling arrangement 21 activated in the step S108. If, however, such an intervention is present, a return is made to step S103 to start a new calculation cycle.

Provided that the determined speed difference value Δn(i) is less than the slip threshold value Thresh_slip, a return may be made to step S103 to start a new calculation cycle. Optionally, however, a check of a priority switch-on criteria may take place in so doing. A check may be made in step S107, for example, whether the vehicle is just stationary (vehicle speed v_Veh=0) and the gas pedal is being actuated (Ped_act=hi). If this applies, a move is made to step S108 to activate the clutch assembly 21 and thus to allow or prepare the transmission of a driving torque to the rear axle 27, although the speed difference value Δn(i) does not yet exceed the slip threshold value Thresh_slip. The priority switch-on criterion in accordance with step S107 may also alternatively be checked, for example, between the step S103 and the step S104 to ensure that the priority switch-on criterion is checked in every calculation cycle.

A simple and stable control may be provided by the method in accordance with FIG. 5 to activate the clutch arrangement 21 after the clutch arrangement 21 has been deactivated by the method in accordance with FIG. 4.

It must still be noted with reference to the configurations of FIGS. 4 and 5 that the counter i is not necessarily required. It is important that an up integration of the torque build-up value ΔM_up and a down integration of the torque reduction value ΔM_down take place, with this being carried out continuously (as an integral over time), quasi-continuously, or (as illustrated with reference to the named counter i) in discrete steps equidistant in time.

It must also be noted that the calculations illustrated in FIG. 4 may be carried out during operation of the vehicle. The current estimated torque value M_est may therefore, also be continuously calculated (i.e., even with a deactivated clutch arrangement). In this case, the named initial value $M_0$ is only set once at the start of operation of the vehicle, with subsequently the calculation of the current estimated torque value M_est always being based on the previously calculated estimated torque value M_est independently of whether the clutch arrangement has been deactivated or activated.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for the control of a clutch arrangement which serves, in a powertrain of a motor vehicle, for the transmission of a torque from an input element to an output element, comprising:
   activating the clutch arrangement;
   calculating an estimated torque value (M_est) in repeating calculation cycles including:
   calculating a torque build-up value (ΔM_up) in dependence on at least one speed difference value (Δn) that corresponds to a speed difference between the input element and the output element;
   calculating a torque reduction value (ΔM_down) in dependence on at least the last calculated estimated torque value (M_est);
   recalculating the estimated torque value (M_est) on the basis of the last calculated estimated torque value by up integration of the calculated torque build-up value and down integration of the calculated torque reduction value; and
   comparing the recalculated estimated torque value (M_est) with a torque threshold value (Thresh_M); and
   deactivating the clutch arrangement when the recalculated estimated torque value is below the torque threshold value.

2. The method in accordance with claim 1, wherein the calculation cycles are started after the clutch arrangement is activated.

3. The method in accordance with claim 1, wherein a predetermined starting value ($M_0$) is used as the last calculated estimated torque value (M_est) in the first calculation cycle.

4. The method in accordance with claim 1, wherein at least one of the calculated torque build-up value (ΔM_up) and the recalculated estimated torque value (M-est) is limited to a maximum value.

5. The method in accordance with claim 1, wherein the clutch arrangement is deactivated when the recalculated estimated torque value is below the torque threshold value and at least one additional switch-off criterion is satisfied.

6. The method in accordance with claim 5 wherein the additional switch-off criterion includes comparing a current vehicle speed value (v_Veh) with a speed threshold value (Thres_v) and is satisfied if the vehicle speed value is greater than the speed threshold value.

7. The method in accordance with claim 1, wherein the clutch arrangement is deactivated independently of the comparison of the recalculated estimated torque value with the torque threshold value when a priority switch-off criterion is satisfied.

8. The method in accordance with claim 7 wherein the priority switch-off criterion includes an active intervention of one of the vehicle's brake system and electronic stability system and is satisfied when such an active intervention occurs.

9. The method in accordance with claim 1 further including activating the clutch arrangement when the speed difference value (Δn) exceeds a slip threshold value (Thresh_slip).

10. The method in accordance with claim 9, wherein one of the speed difference value (Δn) and the slip threshold value (Thresh_slip) is corrected by a cornering correction value.

11. The method in accordance with claim 9, wherein the clutch arrangement is activated when the speed difference value exceeds the slip threshold value and when at least one additional switch-on criterion is satisfied.

12. The method in accordance with claim 11 wherein the additional switch-on criterion includes an active intervention of one of the vehicle's brake system and electronic stability system and is satisfied upon the occurrence of such an active intervention.

13. The method in accordance with claim 9, wherein the clutch arrangement is activated independently of the comparison of the speed difference value with the slip threshold value when a priority switch-on criterion is satisfied.

14. The method in accordance with claim 13 wherein the priority switch-on criterion includes a determination of a current vehicle speed value (v_Veh) and an actuated condition of the gas pedal and is satisfied when the vehicle speed value equals zero and the gas pedal is actuated.

15. The method in accordance with claim 1, wherein the clutch arrangement has a friction clutch that couples the input element to the output element in dependence on a hydraulic pressure that prevails in a pressure space of the clutch arrangement, with the deactivation of the clutch arrangement taking place by opening a drain valve that connects the pressure space to a low pressure space.

16. The method in accordance with claim 15, wherein the clutch arrangement has a pump with a first pump part and a second pump part, the first pump part being rotationally fixedly connected to the input element and the second pump part being rotationally fixedly connected to the output element, wherein the pump is driven by rotation of the input element and of the output element relative to one another, and wherein a pressure side of the pump is connected to the pressure space.

17. The method in accordance with claim 16, wherein an orifice with a substantially temperature independent leakage characteristic is arranged at a leakage line that leads from the pressure space to the low pressure space and extends parallel to the pump.

18. A method for controlling torque transfer between first and second axles of a vehicle through a clutch transmitting torque between first and second rotary elements, the method comprising:
pumping fluid to a pressure space of the clutch to activate the clutch;
calculating an estimated torque value in a repeating calculation cycle by calculating a torque build-up value based on a speed difference value between the first and second rotary elements, calculating a torque reduction value based on the last calculated estimated torque value from the previous calculation cycle, and adding the torque build-up value to the last calculated estimated torque value and subtracting the torque reduction value therefrom to define a recalculated estimated torque value;
comparing the recalculated estimated torque value to a torque threshold value; and
connecting the pressure space of the clutch to a low pressure space to reduce the torque transferred by the clutch when the recalculated estimated torque value is less than the torque threshold value.

19. The method in accordance with claim 18 wherein the clutch is completely deactivated when the recalculated estimated torque value is less than the torque threshold value.

20. The method in accordance with claim 18 wherein a predetermined starting value is used as the last calculated estimated torque value in the first calculation cycle.

21. The method in accordance with claim 18 wherein the clutch is deactivated when the recalculated estimated torque value is below the torque threshold value and at least one additional switch-off criterion is satisfied.

22. The method in accordance with claim 21 wherein the additional switch-off criterion includes comparing a current vehicle speed value with a speed threshold value and is satisfied if the vehicle speed value is greater than the speed threshold value.

23. The method in accordance with claim 18 wherein the clutch is deactivated independently of the comparison of the recalculated estimated torque value with the torque threshold value when a priority switch-off criterion is satisfied.

24. The method in accordance with claim 23 wherein the priority switch-off criterion includes an active intervention of one of the vehicle's brake system and electronic stability system and is satisfied when such an active intervention occurs.

25. The method in accordance with claim 18 further including activating the clutch when the speed difference value exceeds a slip threshold value.

26. The method in accordance with claim 25 wherein the clutch is activated when the speed difference value exceeds the slip threshold value and when at least one additional switch-on criterion is satisfied.

27. The method in accordance with claim 26 wherein the additional switch-on criterion includes an active intervention of one of the vehicle's brake system and electronic stability system and is satisfied when the occurrence of such an active intervention is identified.

28. The method in accordance with claim 25 wherein the clutch is activated independently of the comparison of the speed difference value with the slip threshold value when a priority switch-on criterion is satisfied.

29. The method in accordance with claim 28 wherein the priority switch-on criterion includes a determination of a current vehicle speed value and an actuated condition of the gas pedal and is satisfied when the vehicle speed value equals zero and the gas pedal is actuated.

30. The method in accordance with claim 18 wherein the pressure of the fluid pumped to the pressure space is proportional to the speed differential between the first and second rotary elements when the clutch is activated.

31. A method for the control of a clutch which serves, in a motor vehicle, for the transmission of torque from a first rotary element to a second rotary element, the method comprising:
activating the clutch for transmitting torque from the first rotary element to the second rotary element;
determining a first estimated torque value;
determining a speed difference value between the first and second rotary elements;
calculating a torque build-up value as a function of the speed difference value;
calculating a torque reduction value as function of the estimated torque value;
adding the torque build up value to the first estimated torque value and subtracting the torque reduction value from the sum to define a second estimated torque value;
comparing the second estimated torque value to a torque threshold value;
deactivating the clutch when the second estimated torque value is less than the torque threshold value;
comparing the speed difference value to a slip threshold value; and
reactivating the clutch when the speed difference value exceeds the slip threshold value.

* * * * *